D. SCHUYLER.

Stove-Bottom.

No. 4,961. Reissued July 2, 1872.

Witnesses.
H. L. Perrine,
Wm. J. Peyton,

Inventor.
Daniel Schuyler,
By James L. Norris
Asso. Atty.

AM. PHOTO-LITHOGRAPHIC CO. N.Y. (OSBORNE'S PROCESS.)

UNITED STATES PATENT OFFICE.

DANIEL SCHUYLER, OF TITUSVILLE, PENNSYLVANIA.

IMPROVEMENT IN STOVE-BOTTOMS.

Specification forming part of Letters Patent No. 121,667, dated December 5, 1871; reissue No. 4,961, dated July 2, 1872.

*To all whom it may concern:*

Be it known that I, DANIEL SCHUYLER, of Titusville, Crawford county and State of Pennsylvania, have invented an Improved Stove-Bottom and Conductor for the Removal of Ashes, of which the following is a specification, reference being had to the accompanying drawing, in which—

Figure 1:
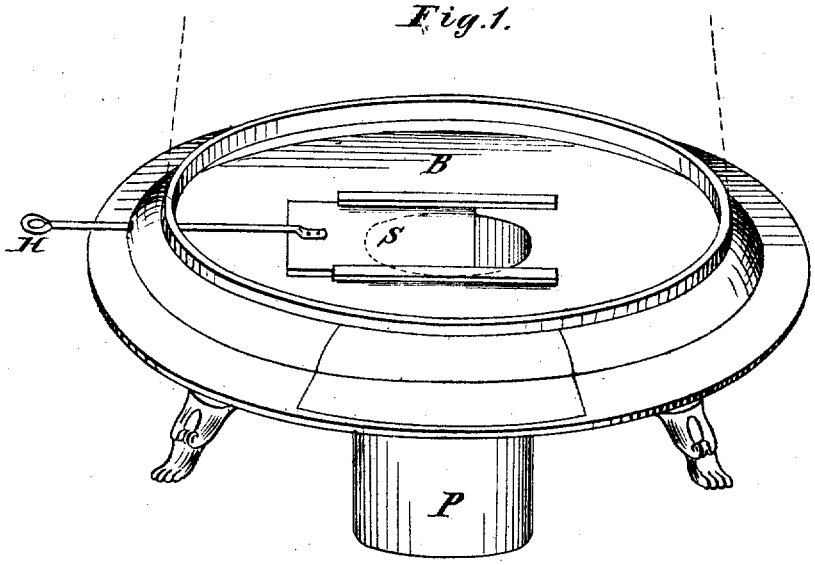
Figure 2:
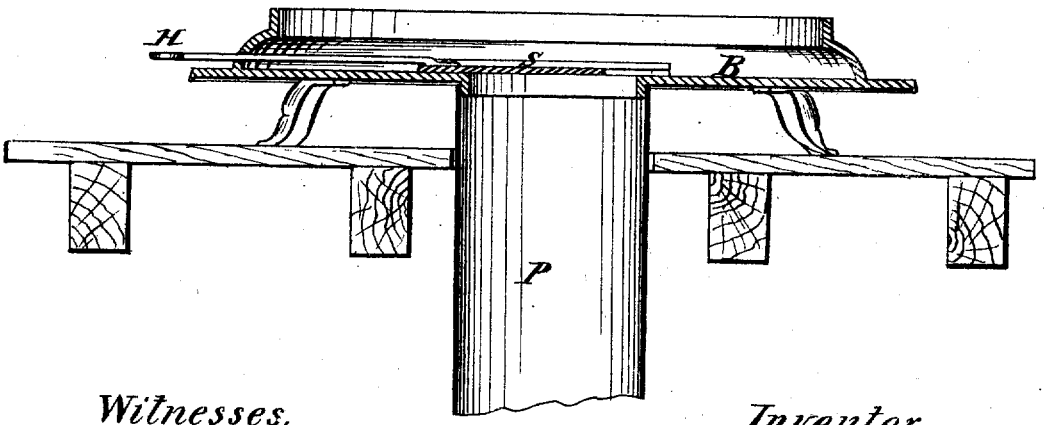

Figure 1 is a perspective view, and Fig. 2 is a longitudinal section.

The object of my invention is to remove the ashes from a stove directly to the cellar or other convenient place without carrying them by hand in the usual manner.

For this purpose the stove-bottom B is perforated, as shown, having a projecting collar, which collar furnishes a suitable means of connecting the conductor P with the said stove-bottom B, which conductor P can be continued to any place to which it is desired to convey the ashes. The opening in the said bottom B is covered by the slide S, which is moved by handle H.

By drawing the slide S before raking the stove the ashes will fall to the desired place at the bottom of pipe P.

Having thus described my invention, what I claim as new, and desire to secure by Letters Patent, is—

The combination of the perforated stove-bottom B and conductor P with a slide, S, for closing the conductor P when ashes are not passing through it, substantially as and for the purpose set forth.

DANIEL SCHUYLER.

Wtnesses:

ARCHIE R. GRAY,

C. W. GRASS.